United States Patent [19]
Hanada et al.

[11] Patent Number: 6,087,433
[45] Date of Patent: Jul. 11, 2000

[54] RESIN COMPOSITION

[75] Inventors: Satoshi Hanada; Ryuma Kuroda, both of Ibaraki; Taiichi Sakaya, Takatsuki, all of Japan

[73] Assignee: Sumitomo Chemical Company, Ltd., Osaka, Japan

[21] Appl. No.: 09/217,084

[22] Filed: Dec. 21, 1998

[30] Foreign Application Priority Data

Dec. 22, 1997 [JP] Japan ................................. 9-352906

[51] Int. Cl.$^7$ ...................................................... C08K 3/34
[52] U.S. Cl. ............................................ 524/492; 524/493
[58] Field of Search ..................................... 524/492, 493

[56] References Cited

U.S. PATENT DOCUMENTS

| | | | |
|---|---|---|---|
| 4,041,223 | 8/1977 | Amemiya et al. | 526/10 |
| 4,613,644 | 9/1986 | Moritani et al. | 524/430 |
| 4,749,744 | 6/1988 | Uejo et al. | 525/58 |
| 4,954,557 | 9/1990 | Iwanami et al. | 524/399 |
| 5,346,950 | 9/1994 | Negi et al. | 525/57 |
| 5,767,179 | 6/1998 | Takado | 524/103 |

FOREIGN PATENT DOCUMENTS

| | | |
|---|---|---|
| 5-6579 | 1/1993 | Japan . |
| 6-18957 | 3/1994 | Japan . |
| 9-286887 | 11/1997 | Japan . |
| 97/00828 | 1/1997 | WIPO . |

*Primary Examiner*—Ana Woodward
*Attorney, Agent, or Firm*—Pillsbury Madison & Sutro LLP

[57] ABSTRACT

There is provided a resin composition which comprises 100 parts by weight of a saponified ethylene/vinyl acetate copolymer (A) and 0.00001–20 parts by weight of a condensed silicate of lithium aluminium double hydroxide (B) wherein the saponified ethylene/vinyl acetate copolymer (A) has 20–50 mole % ethylene units and has a saponification degree of vinyl acetate unit of at least 96%. The resin composition is excellent in heat stability. The resin composition may contain a thermoplastic resin other than the copolymer (A). The resin composition containing the copolymer (A) and the other thermoplastic resin is excellent in compatibility as well as in heat stability.

1 Claim, 2 Drawing Sheets

| NO. | ELEMENT | W.L. | Pki-Bgi | STD(1) | I-RATIO | WT(%) |
|---|---|---|---|---|---|---|
| 1 | O | 23.6200 | 6119.7 | 1130.1 | 5.4150 | 83.202 |
| 2 | Al | 8.3393 | 2238.4 | 4654.6 | 0.4809 | 7.389 |
| 3 | C | 44.7000 | 1326.7 | 3306.7 | 0.4012 | 6.165 |
| 4 | Si | 7.1254 | 813.3 | 5059.1 | 0.1608 | 2.470 |
| 5 | S | 5.3721 | 43.5 | 923.3 | 0.0471 | 0.723 |
| 6 | Ca | 3.3584 | 7.0 | 2117.5 | 0.0033 | 0.051 |
| TOTAL | | | | | | 100.000 |

RESIN COMPOSITION

BACKGROUND OF THE INVENTION

1. Field of the Invention

The present invention relates to resin compositions containing a saponified ethylene/vinyl acetate copolymer (hereinafter sometimes abbreviated as EVOH) which have improved heat stability.

2. Description of Related Art

EVOH has good gas barrier property. Also, molded products, such as films, sheets and bottles, which can be obtained by mnelt-extrusion molding of a blend composition comprising EVOH and another thermoplastic resin, and, if necessary, subsequently conducting stretching and/or heat-treating are excellent in gas barrier property and dynamic properties. Such features of the conventional blend compositions of EVOH and other various thermoplastic resins have been known. However, it has been known that such compositions, in general, are poor in heat stability, and accordingly, since they are likely to cause gel, scorch and heterogeneous phase-separation foreign bodies in the production of films, sheets, bottles, etc. by extrusion molding, the appearance of the products is seriously deteriorated due to the increase of such foreign bodies during a long-time processing. Particularly, although the blend compositions of EVOH and other various thermoplastic resins have the above-mentioned good properties, they can not be applied to extrusion molding at all, or even if they can be applied to that, they may be processed for only a short time. In order to dissolve such problems, Japanese examined patent publications Nos. Hei 5-6579 and Hei 6-18957 disclose a composition containing a hydrotalcite type compound, which, however, is not necessarily satisfactory.

SUMMARY OF THE INVENTION

The inventors of the present invention have intensively studied to improve the heat stability of EVOH and compositions of EVOH and other thermoplastic resin, so that they have found that a resin composition which contains a specific type of EVOH (A) and a suitable amount of condensed silicate of lithium aluminium double hydroxide (B) is excellent in heat stability, and that heat stability of resin compositions which contain EVOH and other thermoplastic resin can be improved by the addition of such a condensed silicate of lithium aluminium double hydroxide (B). As a result, they have accomplished the present invention.

The present invention provides a resin composition which contains 100 parts by weight of a saponified ethylene/vinyl acetate copolymer (A) and 0.00001–20 parts by weight of a condensed silicate of lithium aluminium double hydroxide (B) wherein the saponified ethylene/vinyl acetate copolymer (A) has 20–50 mole % ethylene units and has a saponification degree of vinyl acetate unit of at least 96%. The present invention also provides a resin composition which further contains a thermoplastic resin (C) other than EVOH in addition to the above-mentioned two essential components.

DETAILED DESCRIPTION OF THE INVENTION

Figure 1:
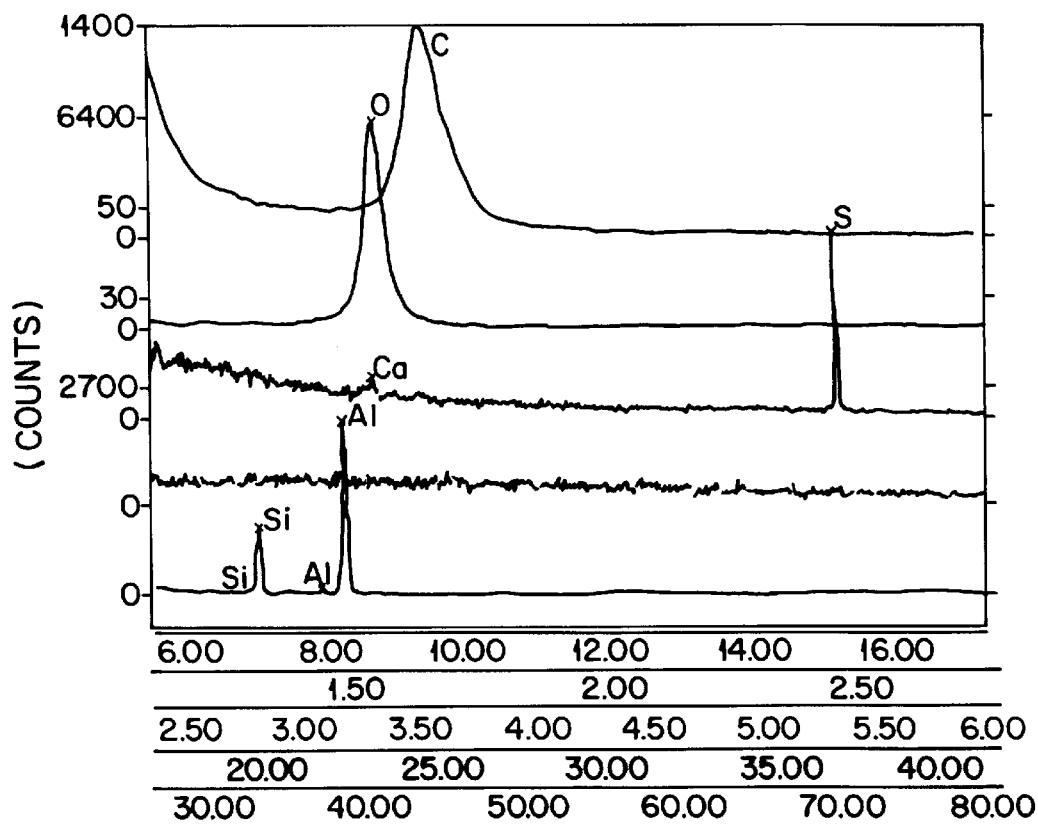
FIG. 1 is an EPMA chart of the condensed silicate of lithium aluminium double hydroxide used in Example.

The saponified ethylene/vinyl acetate copolymer (EVOH) used in the present invention may be any saponified copolymers of ethylene and vinyl acetate which have 20–50 mole % ethylene units and have a saponification degree of vinyl acetate unit of at least 96%. Especially, saponified copolymers having a saponification degree of 99% or more are important because they have extremely high-level gas barrier property among thermoplastic resins and, when used with polyolefin resin, they can provide containers of advanced quality. EVOH (A) may contain, in addition to vinyl acetate units and vinyl alcohol units obtained by saponification of the vinyl acetate units, at most 10 mole % third monomer units derived from, for example, unsaturated carboxylic acids, esters or salts thereof, (meth)acrylamide, (meth)acrylonitrile, α-olefins, e.g., propylene, butene, α-octene and α-octadecene, and vinyl esters other than vinyl acetate.

Representative examples of the condensed silicate of lithium aluminium double hydroxide (B) may be given by the following formula (1):

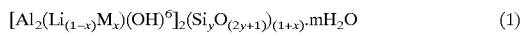

$$[Al_2(Li_{(1-x)}M_x)(OH)^6]_2(Si_yO_{(2y+1)})_{(1+x)} \cdot mH_2O \quad (1)$$

wherein M is a divalent metal cation and m, x and y are numbers defined by the following formulae: $0 \leq m < 5$, $0 \leq x < 1$ and $2 \leq y \leq 4$, which can be prepared, for example, by the process disclosed WO97/00828.

The thermoplastic resin (C) which can be used in the present invention may be a thermoplastic resin besides EVOH (A). Examples of the thermoplastic resin (C) include polyolefin resins, polyamide resins, polyester resins, polystyrene resins, polyvinyl chloride resins, polyaminoaminde resins, acryl resins, polyvinylidene chloride resins, polyurethane resins, polyacetal resins, polycarbonate resins and so on. Among these resins, polyolefin resins, polyamide resins and polyester resins are particularly important in view of their effect and practical utility. Polyvinyl chloride resins and polystyrene resins are also important.

Examples of the polyolefin resins include high-density, middle density or low-density polyethylenes, polyethylenes obtained by copolymerization of ethylene and another monomer such as vinyl acetate, acrylates and an α-olefin, e.g., butene, hexene and 4-methyl-1-pentene, ionomer resins, polypropylene homopolymer, ethylene-grafted polypropylene, polypropylene obtained by copolymerization of propylene and another α-olefin such as ethylene, butene, hexene and 4-methyl-1-pentene, rubber-like polymer-blended modified polypropylene, modified polybutene or modified poly(4-methyl-1-pentene), and mixtures of two or more of the above-listed polyolefin resins.

The polyolefin resins may be modified with an unsaturated carboxylic acid, an ester or an anhydride thereof. For example, modified polyolefin resins which are obtained by graft-copolymerizing the above-listed polyolefin resins with an unsaturated carboxylic acid, such as acrylic acid, methacrylic acid, cinnamic acid, maleic acid, fumaric acid, itaconic acid and benzoic acid, anhydride or ester thereof at a ratio of 0.01–5% by weight can be preferably employed.

The graft-modification of the above polyolefin resin with the unsaturated carboxylic acid, anhydride or ester thereof may be carried out by conventional methods such as a method in which the unsaturated carboxylic acid or a derivative thereof is introduced into the polyolefin resin in molten state using a peroxide and so on. The modified polyolefin resin produced is a polyolefin resin which is at least partially modified with the unsaturated carboxylic acid (or anhydride or ester thereof). Polyolefin resins which can be prepared by diluting modified polyolefin resin, into which a large amount of unsaturated carboxylic acid (or anhydride or ester thereof) has been introduced, with an unmodified polyolefin resin or melting a structure in which a modified polyolefin resin layer is at least partially laminated on an unmodified polyolefin resin layer to make the content of the unsaturated carboxylic acid (or anhydride or ester thereof) 0.005–5% by weight (preferably 0.04–1 part by weight) can be easily obtained and have an economical advantage.

Examples of the polyamide resins include polyacrylamide (Nylon-6), poly(ω-aminoheptanoic acid) (Nylon-7), poly(ω-aminononanoic acid) (Nylon-9), polyundecaneamide (Nylon-11), poly(lauric lactam) (Nylon-12), poly (ethylenediamine adipaminde) (Nylon-2,6), poly (tetramethylene adipamide) (Nylon-4,6), poly (hexamethylene adipamide) (Nylon-6,6), poly (hexamethylene sebacamide) (Nylon-6,10), poly (hexamethylene dodecamide) (Nylon-6,12), poly (octamethylene adipamide) (Nylon-8,6), poly (decamethylene sebacamide) (Nylon-10,8), caprolactam/lauryl lactam copolymer, caprolactam/hexamethylenediammonium adipate copolymer (Nylon 6/66), lauric lactam/hexamethylenediammonium adipate copolymer, hexamethylenediammonium adipate/hexamethylenediammonium sebacate copolymer, ethylenediammonium adipate/hexamethylenediammonium adipate copolymer, caprolactam/hexamethylenediammonium adipate/hexamethylenediammonium sebacate copolymer and so on. Among them, caprolactam/hexamethylenediammonium adipate copolymer (Nylon 6/66) is particularly important for practical use because a blend thereof with EVOH has excellent physical properties.

For improving low-temperature elongation property of EVOH, a polyaminoamide resin can be used. The polyaminoamide resin is a polymer obtainable by the condensation of an aliphatic dicarboxylic acid and a polyalkylene polyamine. The aliphatic dicarboxylic acid may be, for example, malonic acid, succinic acid, glutaric acid, adipic acid, pimelic acid, suberic acid, azelaic acid, sebacic acid, dodecanedioic acid, tetradecanedioic acid, hexadecanedioic acid, octadecanedioic acid, octadecenedioic acid, eicosadioic acid, eicosenedioic acid, docosanedioic acid, 2,2,4-trimethyladipic acid and alicyclic carboxylic acids such as 1,4-cyclohexanedicarboxylic acid and natural fat and oil-source fatty acids, e.g., soybean oil. Particularly, adipic acid, azelaic acid and polymers of natural fat and oil-source fatty acids.

Examples of polyalkylenepolyamine are diethylenetriamine, triethylenetetramine, tetraethylenepentamine and iminobispropylamine. Diethylenetriamine and triethylenetetramine are particularly preferable.

In condensation polymerization of the aliphatic dicarboxylic acid and the polyalkylenepolyamine, a monocarboxylic acid may be used together for controlling viscosity anrd so on. The monocarboxylic acid may be aliphatic monocarboxylic acids such as acetic acid, propionic acid, butyric acid, valeric acid (pentanoic acid), caproic acid (hexanoic acid), enanthic acid, caprylic acid (octanoic acid), pelargonic acid (nonanoic acid), undecanoic acid, lauric acid, tridecanoic acid, myristic acid, myritrainic acid, palmitic acid, stearic acid, oleic acid, linolic acid, arachic acid and behenic acid, and alicyclic monocarboxylic acids such as cyclohexane carboxylic acid and methylcyclohexane carboxylic acid and natural fat and oil-source fatty acids such as soybean oil which is industrially advantageous.

Representative polyester resins which can be used in the present invention are, for example, poly(ethylene terephtalate), poly(butylene terephthalate), poly(ethylene terephthalate/isophthalate), poly(ethyleneglycol/cyclohexane dimethanol/terephthalate) Additionally, the above-exemxplified polymers containing, as a copolymerizing component, diols such as ethylene glycol, butylene glycol, cyclohexane dimiethanol, neopentyl glycol and pentane diol and dicarboxylic acids such as isophthalic acid, benzophenone dicarboxylic acid, diphenylsulfone dicarboxylic acid propylene bisphenylcarboxylic acid), diphenyloxide dicarboxylic acid, oxalic acid, malonic acid, succinic acid, glutaric acid, adipic acid, pimelic acid, suberic acid, azelaic acid, sebacic acid and diethylsuccinic acid are also included.

Polyvinyl chloride resins which can be used in the present invention may be copolymer of vinyl chloride and another monomer such as vinyl acetate, a derivative of maleic acid and higher alkyl vinyl ether, in addition to vinyl chloride homopolymer. Polystyrene resins which can be used polystyrene grafted with butadiene, polystyrene mixed with styrene-butadiene rubber and styrene/maleic anhydride copolymer, in addition to styrene homopolymer.

The content of condensed silicate of lithium aluminium double hydroxide (B) is 0.00001–20 parts by weight, preferably 0.0001–10 parts by weight, based on 100 parts by weight of EVOH (A). Twenty parts by weight or more of the compound (B) sometimes deteriorates physical properties of EVOH other than heat stability and compatibility. When the content of the compound (B) is 0.00001 part by weight, the effect is very slight, in general.

The weight ratio of the thermoplastic resin (C) to EVOH (A) is very important for controlling the dynamic properties and gas permeability from the viewpoint of practical use. As a composition containing, much thermoplastic resin (C), compositions having ratios of the thermoplastic resin (C):EVOH of 60:40 to 99.9:0.1, particularly 70:30 to 99.7:0.3 are preferred. As a composition containing much EVOH (A), compositions having ratios of the thermoplastic resin (C):EVOH (A) of 1:99 to 40:60, particularly 5:95 to 30:70 are preferred.

A method for preparing the resin composition of the present invention is not particularly limited. For example, a method suitable for an individual purpose can be chosen arbitrarily from methods including one in which the components (A) and (B), and optionally (C), are dry-blended, one in which the whole or a part of component (A) and the component (B) are previously mixed and the resultant mixture is incorporated to the components (A) and/or (C) to provide the resin composition containing the components (A), (B) and (C), and the like. In many cases, the method in which the components (A) and (B) are mixed, and then, if necessary, the component (C) is blended is preferred.

Mechanisms of the improvement in heat stability of EVOH and resin compositions of EVOH and other thermoplastic resin caused by the addition of the condensed silicate of lithium aluminium double hydroxide (B) are not clear.

The resin composition of the present invention may contain other suitable additives. Examples of such additives are ones listed in "SEPARATION AND ANALYSIS TECHNOLOGIES OF POLYMER ADDITIVES" published by Nippon Kagaku Joho Co., Ltd. such as antioxidants, light stabilizers, ultraviolet absorbers, anti-sticking agents, anti-fogging agents, plasticizers, antistatic agents, lubricants, colorants, fillers and other polymers. These additives may be blended unless the effect of the present invention deteriorates. Specific examples of the additives are as follows.

Examples of antioxidants include phenol-type antioxidants such as 2,5-di-tert-butylhydroquinone, 2,6-di-tert-butyl-p-cresol, 4,4'-thiobis-(6-tert-butylphenol), 2,2'-methylene-bis(4-methyl-6-tert-butylphenol), octa decyl-3-

(3',5'-di-tert-butyl-4'-hydroxyphenyl)propionate and 4,4'-thiobis-(6-tert-butylphenol), phosphorus-containing antioxidants such as phenyldiisodecylphosphite, diphenylisooctylphosphite, triphenylphosphite, trinonylphenylphosphite, tris-(2,4-di-tert-butylphenyl) phosphite, 4,4'-isopropylidenediphenolalkylphosphite, 1,1,3-tris(2-methyl-4-di-tridecyl)phosphite and 5-tert-butylphenylbutanephenydi(tridecyl)phosphite, sulfur-containing antioxidants such as dilauryl 3,3'-thiodipropionate, ditridecyl 3,3'-thiodipropionate, dimyristyl 3,3'-thiodipropionate, distearyl 3,3'-thiodipropionate, laurylstearyl 3,3'-thiodipropionate, bis[2-methyl-4-(3-n-alkylthiopropionyloxy-5-tert-butylphenyl] sulfide, pentaerythritol tetra(β-lauryl-thiopropionate), 2-mercaptobenzimidazole and 2-mercapto-6-methylbenzimidazole.

The amount of antioxidant added is 0.01–1% by weight, preferably 0.05–0.5% by weight of the whole resin composition. If the amount of antioxidant in a resin composition is more than 1% by weight, molded products formed of the resin composition are likely to have blooming and be damaged their performance. Antioxidants may be used alone or in combination.

Light stabilizers may be hindered amine compounds. Preferred examples of the hindered amine compound include 2,2,6,6-tetraalkylpiperidine derivatives which preferably have a molecular weight of 250 or more and have a substituent on the 4-position. Examples of the substituent on the 4-position are carboxylic acid groups, alkoxy groups, alkylamino groups and so on. The piperidine ring may have an alkyl group on the nitrogen atom. Specific examples of the hindered amine compound are the compounds represented by the following formulae of from (1) to (22):

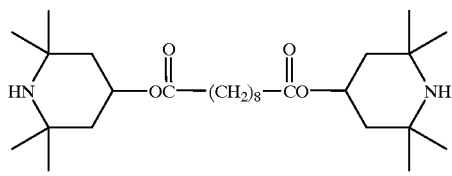

(1)

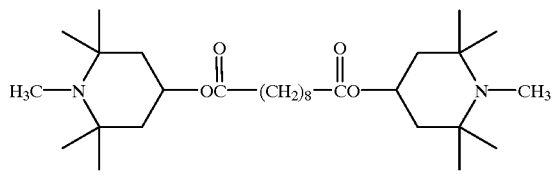

(2)

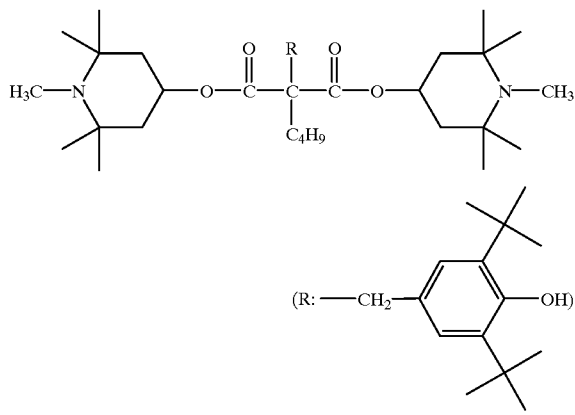

(3)

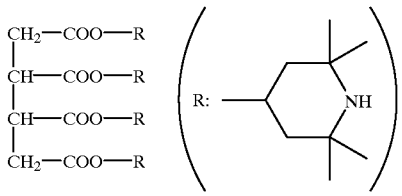

(4)

-continued
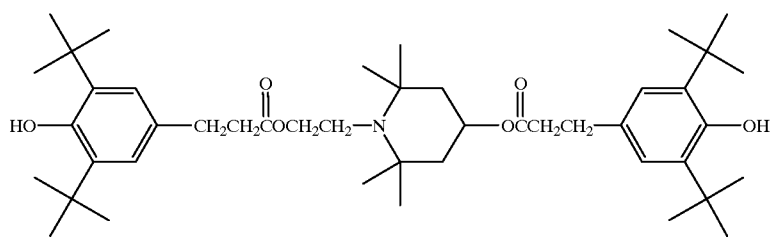
(5)
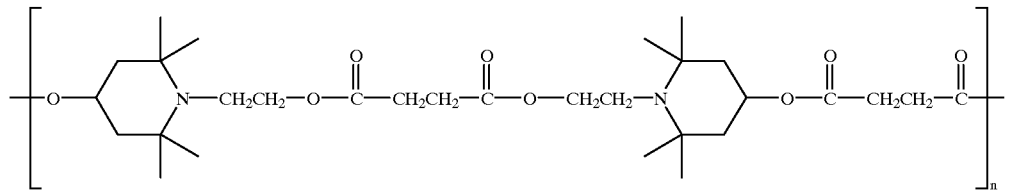
(6)
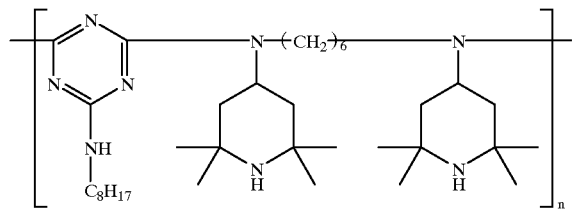
(7)
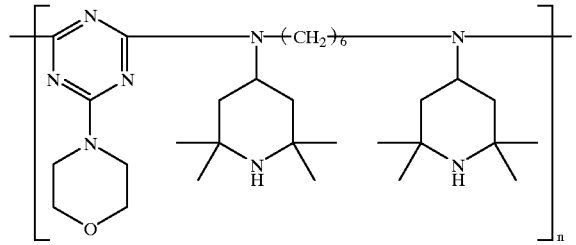
(8)
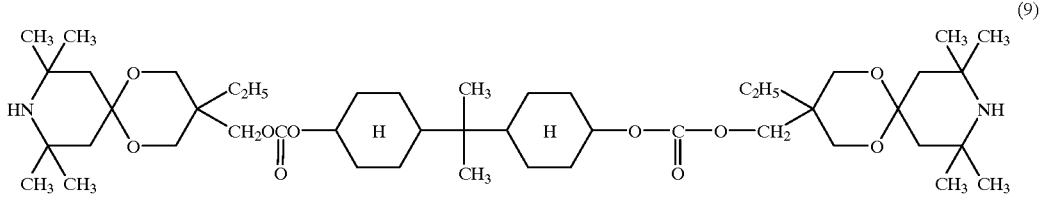
(9)
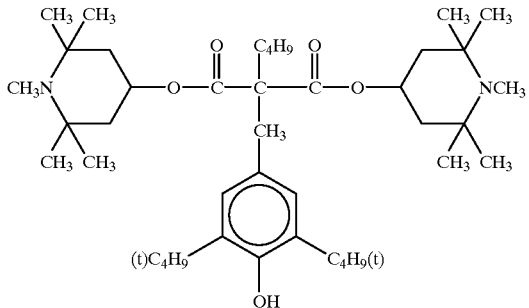
(10)

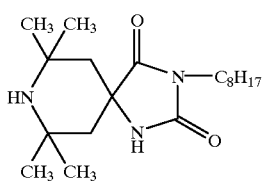
(11)
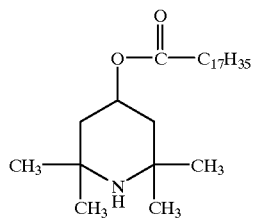
(12)
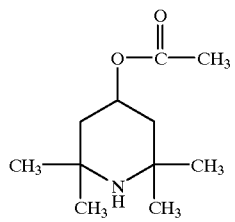
(13)
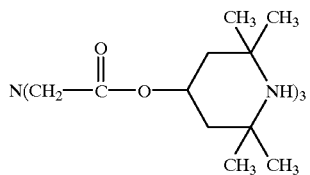
(14)
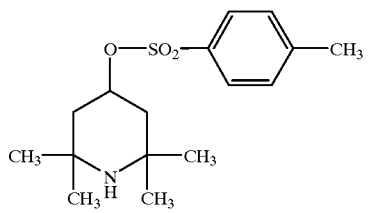
(15)
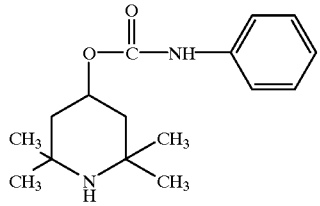
(16)
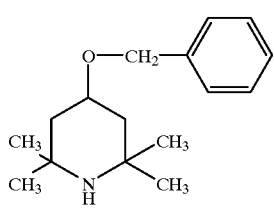
(17)

-continued

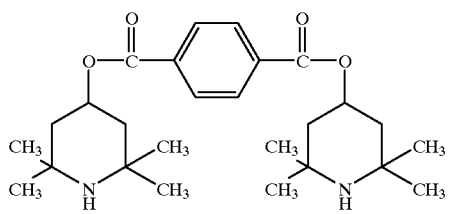
(18)

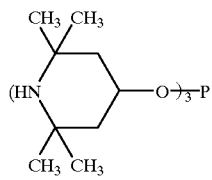
(19)

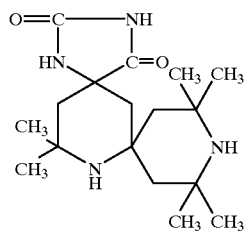
(20)

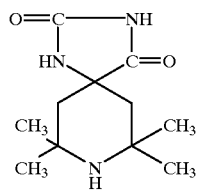
(21)

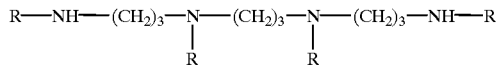
(22)

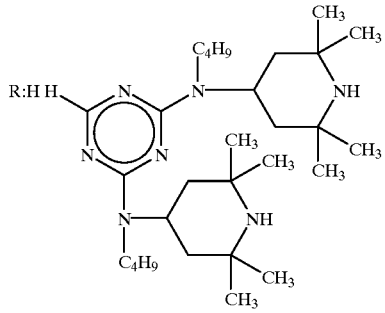

The amount of hindered amine compound added is 0.02–5% by weight and preferably 0.1–2% by weight. If the amount of hindered amine compound in a resin composition is more than 5% by weight, films formed of the resin composition are likely to have blooming and be damaged their performance. Hindered amine compounds may be used alone or in combination.

Ultraviolet absorbers can be roughly classified into four groups including benzophenone type, benzotriazole type, benzoate type and cyanoacrylate type. Specific examples of such ultraviolet absorbers are compounds represented by the following formulae (23) to (31).

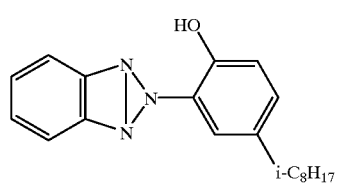
(23)

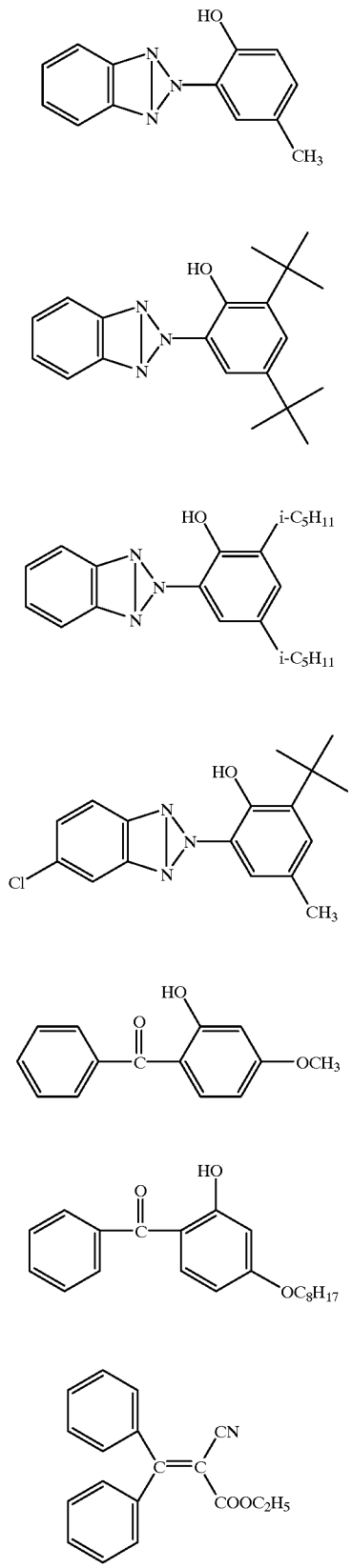

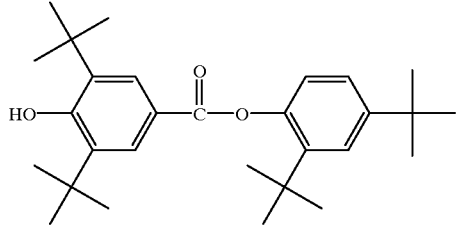

The amount of ultraviolet absorber added is generally 0.01–3% by weight, and preferably 0.05–1% by weight of the resin composition. If the amount of ultraviolet absorber in a resin composition is more than 3% by weight, molded products formed of the resin composition are likely to have blooming and be damaged their performance. Ultraviolet absorbers may be used alone or in combination.

For the purpose of providing anti-sticking property to molded products formed of the resin composition of the present invention, various anti-sticking agents may be incorporated to the resin composition. The anti-sticking agent is a material which has anti-sticking property, which quickly clears the vapor condensed on the film. The anti-sticking property prevents condensed vapor to suspend and then fog the film.

The anti-sticking agent may be nonionic surfactants such as sorbitan aliphatic acid ester-type surfactants, e.g., sorbitan monostearate and sorbitan monopalmitate; glycerol aliphatic acid ester-type surfactants, e.g., glycerol monolaurate, glycerol monopalmitate, glycerol monostearate, diglycerol distearate and triglycerol monostearate; polyethylene glycol-type surfactants, e.g., polyethylene glycol monopalmitate and polyethylene glycol monostearate; adducts of alkylphenol with alkylene oxide; and organic acid esters of sorbitan/glycerol condensation products. The amount of antisticking agent added is generally 0.3–5% by weight, preferably 0.5–4% by weight and more preferably 1–3% by weight of the resin composition.

The resin composition of the present invention, of which agricultural covering films and the like are formed, may contain anti-fogging agents in order to have anti-fogging property. The anti-fogging agent is a material which has the anti-fogging property. The anti-fogging property prevents the procurement of fog within the "greenhouse". Examples of such an antifogging agent include fluorine compounds having a perfluoroalkyl group, ω-hydrofluoroalkyl group or the like (particularly, fluorine-containing surfactants) and silicone-type compounds having an alkylsiloxane group (particularly silicone-type surfactants). The amount of anti-fogging agent added is generally 0.01–4% by weight, preferably 0.02–2% by weight and more preferably 0.05–1% by weight of the resin composition.

Examples of plasticizers are dimethyl phthalate, diethyl phthalate, dioctyl phthalate, wax, liquid paraffin, phosphate, dipentaerythritol and di(trimethylolpropane). Particularly, dipentaerythritol, ditrimethylolpropane and a mixture of dipentaerythritol, ditrimethylolpropane are preferred. The amount of a plasticizer added is generally 0.1–30% by weight and preferably 1–10% by weight. If the amount of plasticizer in a resin composition is more than 30% by weight, molded products formed of the resin composition are likely to have blooming and be damaged their performance. Plasticizers may be used alone or in combination.

Examples of antistatic agent include pentaerythritol monostearate, sorbitan monopalmitate, sulfated oleic acid, polyethylene oxide and carbowax. The antistatic agent may be contained in the resin composition in an adequate quantity.

A lubricant, examples of which include ethylene-bisstearamide, butyl stearate and calcium stearate, may be contained in the resin composition in an adequate quantity.

A colorant, examples of which include carbon black, phthalocyanine, quinacridone, indoline, azo pigments, titanium oxide and red iron oxide, may be contained in the resin composition in an adequate quantity.

Examples of filler include glass fiber, asbestos, parastonite, calcium silicate, aluminium silicate, calcium carbonate and inorganic laminar compounds. The filler may be incorporated to the resin composition in an adequate amount. Among these fillers, the inorganic laminar compounds are known to improve gas barrier property, and therefore are particularly important.

The inorganic laminar compound is an inorganic compound wherein unit crystal layers are mutually stacked to form a layer structure. In other words, a "laminar compound" is a compound or material having the layer structure. The "layer structure" is a structure wherein planes, each of which comprises atoms strongly bonded to each other on the basis of covalent bonds, etc., so as to form close packing, are stacked substantially parallel to each other on the basis of weak bonding power such as van der Waals' force. Specific examples of the inorganic laminar compound may include graphite, phosphoric acid salt-type derivative compounds (such as zirconium phosphate-type compounds), chalcogen-type compounds, clay minerals, etc. The "chalcogen-type compound" used herein refers to a di-chalcogen type compound which comprises an element of Group IV (Ti, Zr, Hf), Group V (V, Nb, Ta), and Group VI (Mo, W), and is represented by a formula of $MX_2$. Here, M is an atom selected from Groups IV, V and VI and X is a chalcogen (S, Se, Te). Clay minerals having property to be swollen or cleft by a solvent are preferably employed. The clay minerals may be classified into two types, i.e., one type having a two-layer structure, that comprises a silica tetrahedral layer and an octahedral layer which is disposed thereon and comprises a central metal such as aluminum and magnesium; and another type having a three-layer structure, that comprises an octahedral layer comprising a central metal such as aluminum and magnesium, and a silica tetrahedral layer disposed on both sides of the octahedral layer so as to sandwich the octahedral layer. Specific examples of the former two-layer type include kaolinite series, antigorite series, etc. Specific examples of the latter three-layer type include smectite series, vermiculite series, mica series, etc. These groups differs in the number of interlayer cations. More specific examples of clay minerals include kaolinite, dickite, nacrite, halloysite, antigorite, chrysotile, pyrophyllite, montmorillonite, beidellite, nontronite, saponite, sauconite, stevensite, hectorite, tetrasilylic mica, sodium taeniolite, muscovite, margarite, talc, vermiculite, phlogopite, xanthophyllite, chlorite, etc.

Examples of devices for mixing ingredients to produce the resin composition of the present invention include a ribbon blender, a high-speed mixer, a keader, a mixing roll, an extruder and an intensive mixer. The resin composition of the present invention can be formed into various molded products such as films, sheets, tubes and bottles by conventional means such as a melt-extrusion molding machine, a compression molding machine, a transfer molding machine, an injection molding machine, a blow molding machine, a heat molding machine and a rotational molding machine. Although the extrusion temperature in the molding may be appropriately selected in accordance with the type and molecular weight of the resin used, the mixing ratio of the ingredients, properties of the extruder, and the like, it falls within the range of 170° C. to 350° C. in most cases. When the adhesion between the layer of the resin composition of the present invention and the layer of other resin is not sufficient, it is advisable to provide an adhesive layer between the two layers. The adhesive resin is not particularly limited so long as it does not cause delamination during the use of the laminate in practice. A typical example of such adhesive resins is a modified olefin polymer containing carboxyl groups which is obtained by chemically bonding (for example, through addition or grafting) an unsaturated carboxylic acid or its anhydride to an olefin polymer such as polyolefins, e.g., polyethylene, polypropylene and polybutene, and polymers comprising olefins as the main monomer units. Specific examples of a preferred adhesive resin include a resin which is or a mixture of two resins which are selected from the group consisting of maleic anhydride-graft-modified polyethylene, maleic anhydride-graft-modified polypropylene, maleic anhydride-graft-modified ethylene/ethyl acrylate copolymer, maleic anhydride-graft-modified ethylene/vinyl acetate copolymer and ionomer resin.

When a product, such as a sheet, a film, a tube and a bottle, is produced by using the resin composition of the present invention, such a product may have either a single layer structure or a multi-layered structure. The multi-layered structure may have a layer or layers of materials other than the resin composition of the present invention. The multi-layered structure may have two or more layers of the resin composition of the present invention. The two or more layers may have either an identical composition or different compositions from each other. Also, the multi-layered structure may have two or more layers other than the layer of the resin composition of the present invention. In such a case, the two or more layers may have an identical composition or different compositions from each other.

As mentioned above, the resin composition of the present invention can exhibit particularity in adhesion, when it is used as a layer in a multi-layered member. When the multi-layered member has a layer structure such as E/F/E, F/E/F, F/F/F (the central F containing much EVOH), F/D/E, F/D/E/D/F, P/F/D/E/E/F/P and P/F/D/E/D/P, the multi-layered member can provide beautiful molded products which has high interlayer adhesion. Here, an EVOH layer, a thermoplastic resin layer, an adhesive resin layer and a layer of the resin composition of the present invention are indicated by the symbols E, P, D and F, respectively. In such multi-layered members, the resin composition of the present invention may be replaced by scrap of the multi-layered members.

The multi-layer molding is usually carried out by a coextrusion molding technique using extruders, the number of which corresponds to the number of resin layers contained in the multi-layered molded products to be produced. In the technique, the resins which have been molten in the extruders are extruded in a state where they are laminated with each other. Other multi-layer molding methods such as extrusion coating and dry lamination may be employed. Stretching, such as uniaxial stretching, biaxial stretching and blow stretching, of single layer molded products composed of the resin composition of the present invention or multi-layered molded products containing the resin composition of the present invention can provide molded products having further particularity in dynamic properties, gas barrier property and so on. The molded products obtained from the resin composition of the present invention have both uniform distribution of ingredients and excellent appearance. Accordingly, they have various excellent properties such as high strength and high gas barrier property. The molded products can favorably be employed in various uses including general food packaging, retort food packaging, squeezable bottles, blow bottles, medicine packaging, electronic parts packaging and gasoline tanks. Therefore, they have much industrial importance.

According to the present invention, heat stability of both EVOH and a blend composition comprising EVOH and another resin can be improved by incorporating an adequate quantity of condensed silicate of lithium aluminium double hydroxide.

The present invention will be explained in detail by the following Examples, which should not be construed to limit the scope of the invention.

The methods of determination of the physical properties are described below.

Heat Stability Test (1)

One hundred parts by weight of saponified ethylene/vinyl acetate copolymer and 0.1 part by weight of condensed silicate of lithium aluminium double hydroxide were melt-kneaded in Laboplast mill, manufactured by Toyo Seiki K.K. at 210° C., 60 rpm for 120 minutes to produce a resin composition. Change in color of the resin material between before and after kneading was visually observed and heat stability in kneading was evaluated according to the following criteria:

○: little change in color was observed and heat stability in kneading was excellent;

Δ: a certain change in color was observed and heat stability in kneading was poor; and X: serious change in color was observed and heat stability in kneading was very poor.

Heat Stability Test 2

A resin composition was hot-pressed at 20° C. for three minutes, and then cold-pressed at 30° C. for five minutes to be formed into a 2-millimeter-thick pressed sheet (the first sheet). A yellow index (YI) of the sheet was measured using Color Computer manufactured by Sugar Test Instrument Co., Ltd. Separately, the resin composition was further melt-kneaded at 210° C., 60 rpm for 120 minutes, and then formed into a 2-millimeter-thick sheet (the second sheet) by hot-pressing and subsequent cold-pressing, followed by being measured its YI. ΔYI was calculated by subtracting the YI of the second sheet from the YI of the first sheet. The smaller the value of ΔYI is, the better the heat stability of the resin composition is.

EXAMPLE 1

Figure 2:
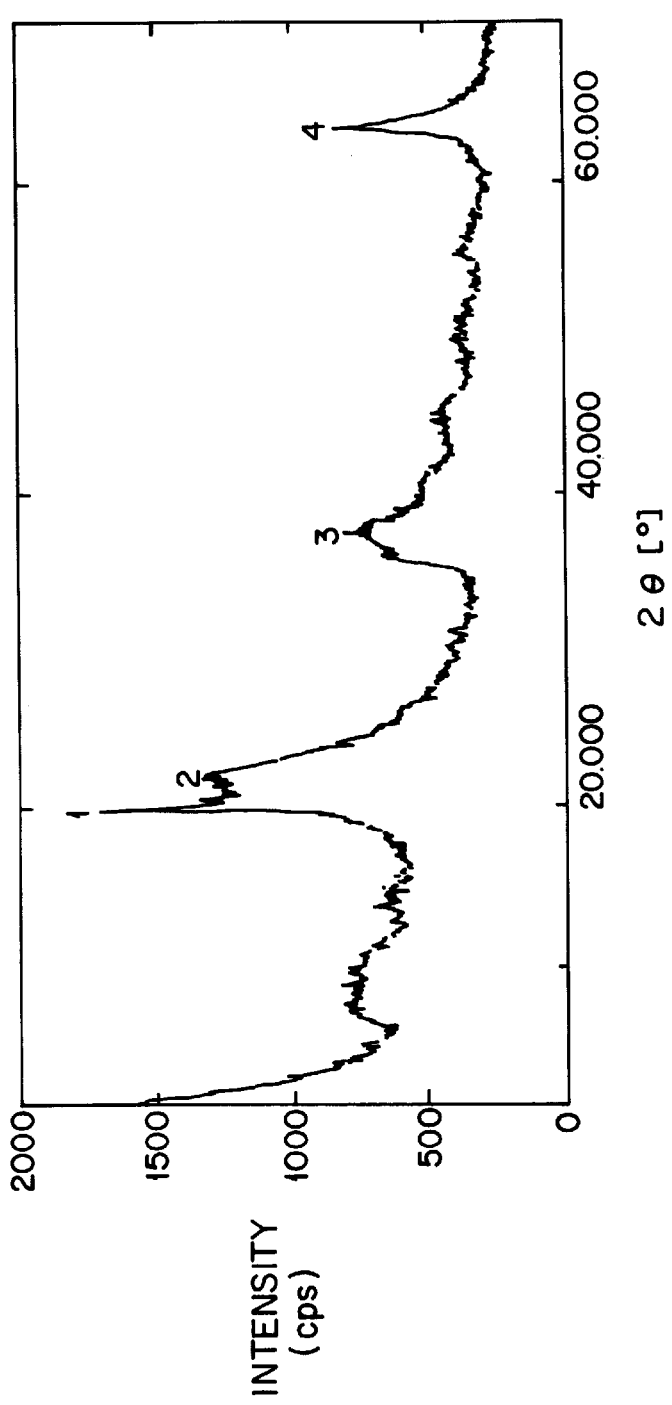
FIG. 2 is an X-ray diffraction chart of the condensed silicate of lithium aluminium double hydroxide used in Example.

Sixty gram of saponified ethylene/vinyl acetate copolymer (trade name: EP-E105A; manufactured by Kuraray Co., Ltd.; ethylene unit content: 44 mole %; saponification degree: 99% or more; hereinafter abbreviated as EVOH-E) and 0.06 g of condensed silicate of lithium aluminium double hydroxide (trade name: Fujirain LS; manufactured by Fuji Chemical Industry, Co., Ltd.) were melt-kneaded in Laboplast mill, manufactured by Toyo Seiki K.K. at 210° C., 60 rpm for 120 minutes to produce a resin composition comprising 100 parts by weight of EVOH and 0.1 part by weight of Fujirain LS. Fujirain LS had a chemical composition of $[Al_2(Li_{0.99}Mg_{0.01})(OH)_6]_2(Si_2O_6)_{1.08} \cdot mH_2O$, which was determined by an EPMA analysis. The resin composition was evaluated its heat stability. The results are given in Table 1. The charts of EPMA and X-ray diffraction of Fujirain LS are given in FIGS. 1 and 2, respectively.

COMPARATIVE EXAMPLE 1

A resin composition was prepared in the same way as disclosed in Example 1 except that no Fujirain LS was used. The resultant resin composition was evaluated in the same way as disclosed in Example 1. The results are given in Table 1.

COMPARATIVE EXAMPLE 2

A resin composition was prepared in the same way as disclosed in Example 1 except for using saponified ethylene/vinyl acetate copolymer having an ethylene unit content of 81 mole % (trade name: Evatate R50-11; hereinafter abbreviated as EVA) in place of that used in Example 1. The resultant resin composition was evaluated in the same way as disclosed Example 1. The results are given in Table 1.

COMPARATIVE EXAMPLE 3

A resin composition was prepared in the same way as disclosed in Comparative Example 2 except that no Fujirain LS was used. The resultant resin composition was evaluated in the same way as disclosed in Example 1. The results are given in Table 1.

As being clear from the results of the Example, a resin composition obtained by incorporating a condensed silicate of lithium aluminium double hydroxide into a saponified ethylene/vinyl acetate copolymer exhibited a law ΔYI, and little coloring of the resin composition was recognized through visual observation.

As being clear from the Comparative Examples, when incorporating no condensed silicate of lithium aluminium double hydroxide to the saponified ethylene/vinyl acetate copolymer or when using the ethylene/vinyl acetate copolymer (EVA) as a base resin, large valued of ΔYI were obtained. Also, when the ethylene/vinyl acetate copolymer (EVA) was used as a base resin, no reduction in ΔYI was recognized, and no effect by incorporating the condensed silicate of lithium aluminium double hydroxide was observed. In the Comparative Examples, the resin compositions were likely to be suffered from degradation and coloring. Therefore, the resin composition were poor in processability.

TABLE 1

|  | Example 1 | Comp. Example 1 | Comp. Example 2 | Comp. Example 3 |
|---|---|---|---|---|
| Base resin (parts by weight) | EVOH-E 100 | EVOH-E 100 | EVA 100 | EVA 100 |
| Additives (parts by weight) | Condensed silicate of lithium aluminium double salt (Fujirain LS) 0.1 | — 0 | Condensed silicate of lithium aluminium double salt (Fujirain LS) 0.1 | — 0 |
| Heat stability test (1) | ○ | Δ | x | Δ |
| Heat stability test (2) | 72.3 | 82.0 | 83.8 | 75.6 |

What is claimed is:

1. A resin composition comprising:

100 parts by weight of a saponified ethylene/vinyl acetate copolymer (A) which has 20–50 mole % ethylene units and a saponification degree of vinyl acetate unit of at least 96%; and 0.00001–20 parts by weight of a condensed silicate of lithium aluminum double hydroxide (B) which is represented by the formula:

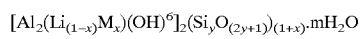

wherein M represents a divalent metal cation and m, x and y are numbers defined by the following formulae: $0 \leq m \leq 5$, $0 \leq x < 1$ and $2 \leq y \leq 4$.

* * * * *